United States Patent Office 3,296,243
Patented Jan. 3, 1967

---

3,296,243
PROCESS FOR THE PRODUCTION OF SER[4]-ILE[8]-OXYTOCIN AND INTERMEDIATES THEREIN
Albert Jöhl, Basel, Switzerland, Albert Hartmann, Grenzach, Germany, and Hans Rink, Basel, Switzerland, assignors to Geigy Chemical Corporation, Greenburgh, N.Y., a corporation of Delaware
No Drawing. Filed Mar. 25, 1963, Ser. No. 267,772
Claims priority, application Switzerland, Mar. 30, 1962, 3,863/62
21 Claims. (Cl. 260—112.5)

This invention relates to a process for the production of a cyclic nonapeptidamide, ser[4]-ile[8]-oxytocin, and to novel polypeptide compounds produced by said process as intermediates.

The aforesaid nonapeptide differs from the known oxytocin through the presence of the L-serine-radical instead of the L-glutamine-radical in the fourth position, and through the presence of the L-isoleucine-radical in place of the L-leucine-radical in the eighth position. Consequently, it has the following formula ibidem, 7, 567 (1952). The activities are given in international units (I.U.); one I.U. corresponds to the activity of 0.5 mg. of the 3rd international standard powder obtained from the beef posterior pituitary and provided by the Institute of Medical Research, Mill Hill, London, England.

The above-described advantageous properties of the nonapeptide of Formula I made its synthetic production desirable, and it is the principal object of the instant invention to provide such process.

According to the invention, this object is attained by a process which is illustrated in the following flowsheets and comprises three stages which are (A) The preparation of a C-terminal pentapeptidamide,
(B) The preparation of a tetrapeptide, and
(C) The coupling of the latter with the pentapeptidamide to obtain the desired nonapeptidamide. In more detail, the process according to the invention may be

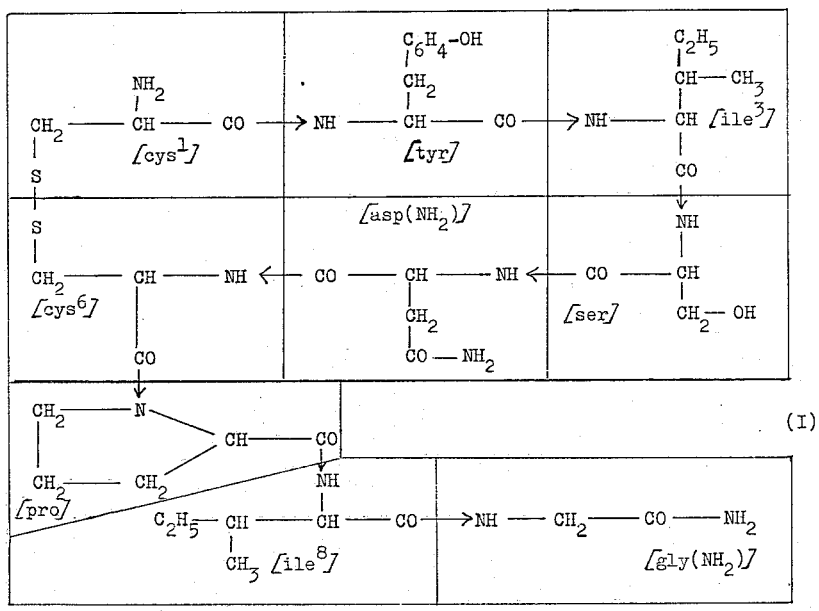

(I)

wherein —$C_6H_4$—OH represents the p-hydroxyphenyl radical.

The nonapeptidamide ser[4]-ile[8]-oxytocin (Formula I) shows oxytocic activity similar to that of the known oxytocin, but the blood-pressure-raising effect of the latter is greatly reduced in the pharmacodynamic spectrum of the nonapeptamide of Formula I. Its application is, therefore, of interest in the various indications of oxytocin.

Thus, it has been found that, while in the case of oxytocin, the ratio of the oxytocic effect on the isolated rat uterus to the blood pressure-raising effect on the rat amounts to 90:1, that ratio in the case of Ser[4]-ile[8]-oxytocin, is 2000:1. The oxytocic effect was determined by the method described by P. Holton in Brit. J. Pharmacol. 3, 328 (1948); determination of the blood-pressure-raising effect was made by the method described by J. Dekanski, schematically represented by the following diagram, omitting protecting groups for the sake of clarity:

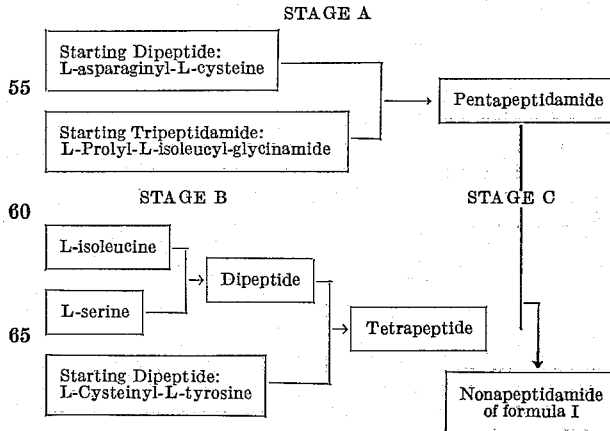

It is a particular advantage of the process according to the invention that the undesirable racemization of individual peptides which easily occurs in syntheses in the polypeptide field, is to all practical purposes avoided.

In the flow diagrams which illustrate the process according to the invention, the following symbols and abbreviations are used:

The nine amino acid radicals of the nonapeptidamide of Formula I are designated by cys, tyr, ile, ser, asp(NH₂), pro and gly(NH₂), which designations are used in this specification and the appended claims to describe these radicals; the bond between two amino acid radicals is represented by an arrow (→) in the direction from —CO— to —NH—. The following symbols or abbreviations are employed for protective groupings:

Z for the class of protective groups at N-terminals, which class consists, in the process according to the invention, preferably of lower alkoxy-carbonyl radicals ("lower" in the instant specification and the appended claims designating 1 to 4 carbon atoms when used in connection with aliphatic hydrocarbon radicals, unless stated otherwise) and in particular the t-butyloxycarbonyl radical, further the benzyloxycarbonyl radical, and the trityl (triphenylmethyl) radical.

BOC designates, in particular, the t-butyloxycarbonyl radical;

Q represents the class of protective groups applied to the mercapto group of the cysteine radical, which consists, in the process according to the invention, preferably of the benzyl, the diphenylmethyl, and the trityl and the benzylthiomethyl radicals; and T represents the class of protective groups for N-terminals of the cysteinyl radical of reactants containing the same, in the process according to the invention, which class consists essentially of tosyl, trityl, benzyloxycarbonyl, and lower alkoxy-carbonyl, in particular t-butoxycarbonyl, with tosyl being preferred.

Therefore, for example, the group

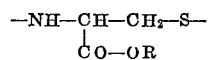

wherein Q is benzyl and T is tosyl, means the radical of the formula

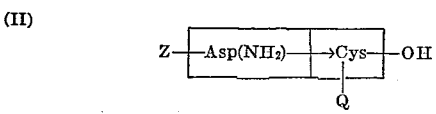

STAGE A

As starting materials for Stage A of the process according to the invention, there is used as the one reactant either the free dipeptide acid of the formula (II)

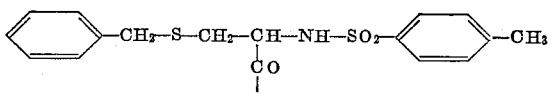

or a functional derivative thereof.

In the functional derivatives used in the process according to the invention, the "cys" portion of the above compound of Formula II is replaced by a radical of the following structure:

wherein R, which replaced the hydrogen atom of the free acid, represents straight chain lower alkyl, and, of branched lower alkyl radicals, isopropyl and isobutyl, while the functional derivative with t-butyl in the place of R is readily convertible to the free acid; furthermore, R represents benzyl or p-nitrobenzyl.

As to the other reactant of Stage A of the process according to the invention, there is used the known tripeptidamide of the formula (III)

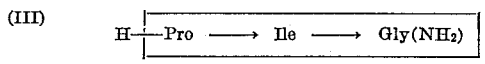

i.e. L-prolyl-L-isoleucyl-glycinamide.

FLOW DIAGRAM—STAGE A

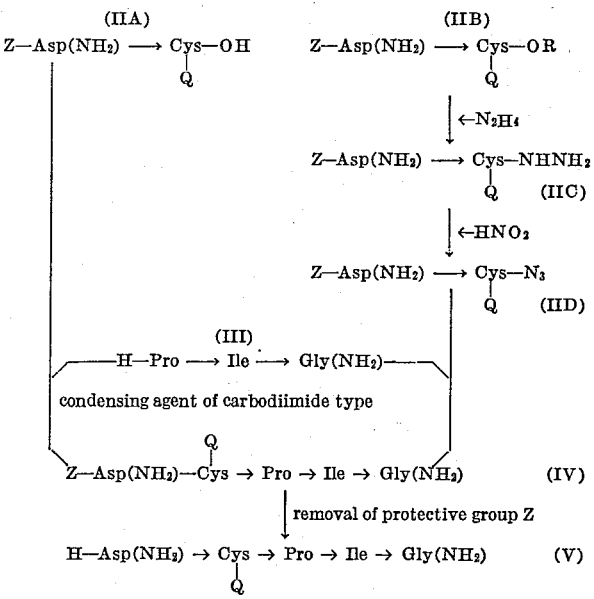

The reaction, in Stage A of the process according to the invention, illustrated in the above flow-diagram as IIA+III=IV is carried out at a temperature below 10° C., in the liquid phase, with the aid of a condensing agent of the carbodiimide type, among which there are dicyclohexylcarbodiimide, di-isopropylcarbodiimide and 1-cyclohexyl - 3 - (2 - morpholinyl - (4) - ethyl)-carbodiimide metho-p-toluene sulfonate, the first named one being preferred.

This reaction, as well as all others in the process according to the invention, unless expressly stated otherwise, is carried out in an inert organic dispersing medium, either a solvent in the case of a solution, or a suspending medium in case of a suspension of one or both of the reactants, which medium consists preferably of dimethylformamide, acetonitrile, ethyl acetate or tetrahydrofuran; chloroform, ethylenedichloride or dioxan are also suitable.

The reaction with hydrazine according to the formula IIB+N₂H₄→IIC is carried out at a temperature at which the reaction mixture is liquid, the dispersing medium being, in this case, preferably dimethylformamide or (anhydrous) methanol, ethanol or ethylene glycol. The hydrazide is recovered in a conventional manner.

The conversion of the hydrazide IIC with nitrous acid to the azide IID is carried out at temperatures below 10° C., in the liquid phase, in an inert medium such as water, aqueous dimethylformamide and the like.

The next following condensation step must be carried out in a liquid medium which is a solvent for both reactants, preferably dimethylformamide or ethyl acetate.

The azide is then recovered in a conventional manner and is then introduced into the reaction

IID+III=IV which is carried out without the presence of any condensing agent being required, and at a temperature below 0° C., in the liquid phase, the low temperature being required to avoid side reactions.

The removal of the protecting group Z from the resulting compound IV is effected with hydrogen bromide in glacial acetic acid or in ethyl acetate and the like inert medium, or with trifluoroacetic acid, at a temperature ranging from room temperature (20° C.) to the reflux temperature of the mixture. The final product of Stage A, namely the compound V, is recovered in a conventional manner and then used as reactant in Stage C, as described further below.

STAGE B

As starting materials for the second Stage B of the process according to the invention, there are used, firstly, compounds of the formula (VI)   Z—Ile—O—X wherein X is either hydrogen, in which case the reactant is the free aminoacid having its N-terminal protected by the group Z, or X is lower alkoxycarbonyl, in particular ethoxycarbonyl or isobutyloxycarbonyl, i.e. the reactant is a so-called mixed anhydride, or X is p-nitrophenyl, or cyanomethyl or the phenylthio or a similar radical in which case the reactant is a so-called reactive ester.

Secondly there is used as the other starting reactant in the Stage B of the process according to the invention either a compound of the formula (VII)   H—Ser—O—R$_1$ wherein R$_1$ is lower alkyl or a compound of the formula (VIII)   H—Ser—NH—NH—BOC which latter is obtained from an N-protected free acid of the formula (VIIIA)   Z—Ser—OH by reaction with t-butyloxycarbonyl hydrazine, and reductive removal of the protecting group Z from the resulting compound of the formula (VIIIB)   Z—Ser—NH—NH—BOC in a stream of hydrogen and in contact with a palladium-on-carbon type hydrogenation catalyst, Z in Formulae VIIIA and VIIIB being preferably benzyloxycarbonyl (i.e. carbobenzyloxy).

Thirdly, there is used as reactant with the reaction product obtained from the first and second starting reactant, a known dipeptide of the formula (XI)   T—Cys→Tyr—Y
              |
              Q a more detailed structural formula of which is

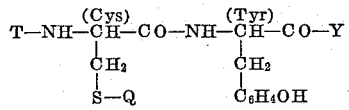

and wherein:

Y is either the hydroxyl group or the azide radical, —N$_3$, and

Q has the meaning given further above.

FLOW DIAGRAM—STAGE B

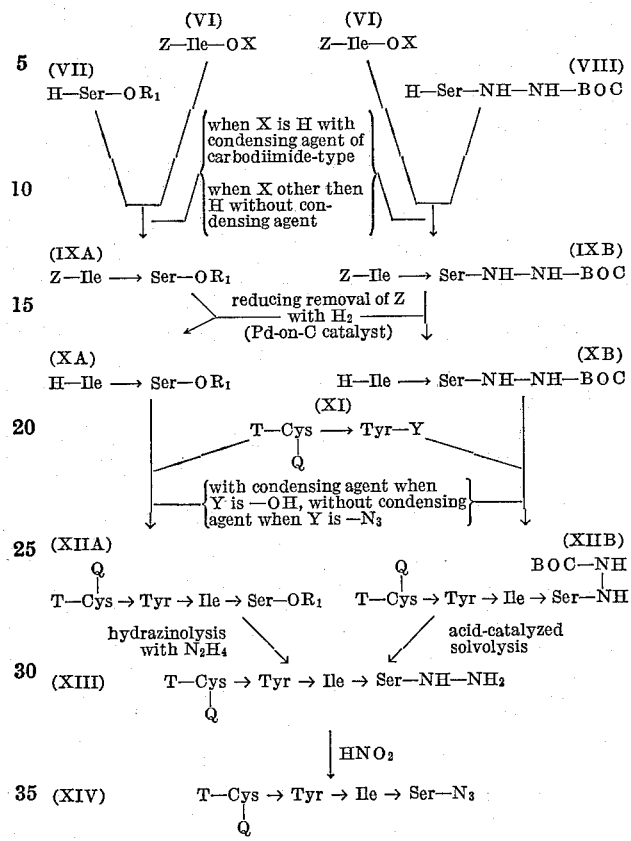

The reaction in Stage B of the process according to the invention illustraed in the above Flow Diagram of Stage B, by which the starting compounds VI and VII are coupled to a dipeptide (IXA) is carried out in the liquid phase without a condensing agent when X in the formula of the isoleucin starting compound VI is one of the aforementioned groups other than hydrogen, and the other reactant is carried out in one of the above-mentioned generally applicable group of dispersants, and the temperature is maintained below 0° C. and preferably between −10° and −20° C.

The same rule applies in the reaction between compounds VI and VIII.

The protective group Z can be removed from the resulting intermediates of Formulas IXA and IXB by treatment with hydrogen in the presence of a palladium type hydrogenation catalyst, such as palladium-on-carbon at room temperature.

The resulting N-terminal-unprotected isoleucyl-sery dipeptide of Formulas XA and XB is then reacted with a known S- and N-protected dipeptide of Formula XI, the C-terminal of which is occupied by a hydroxyl or by an —N$_3$ group.

In the former case, when Y in Formula XI of the cysteinyl-tyrosyl dipeptide reactant is —OH, the reaction is carried out with a carbodiimide-type condensing agent under the same conditions as given above for similar condensations, while, when Y in Formula XI is the azide radical, the reaction is carried out without a condensing agent, at a temperature below 0° C., in the liquid phase, in an inert medium which is a solvent for both reactants, preferably dimethylformamide.

The resulting S- and N-protected tetrapeptide, of Formulas XIIA or XIIB, is then further treated to obtain the corresponding hydrazine XIII, in the case of compound XIIA by hydrazinolysis under the conditions described in the reaction of compound IIB with hydrazine, supra, or, in the case of compound XIIB, by acid-catalyzed solvolysis, e.g. with hydrochloric acid in methanol or ethyl acetate or the like solvent, or with trifluoroacetic acid, preferably of about 90% concentration, whereby only the protective t-butoxycarbonyl radical (BOC) is split off from compound XIIB and replaced by a hydrogen atom.

The hydrazide of Formula XIII is then converted to the azide of Formula XIV with nitrous acid under the same conditions as described in converting compound IIC to IIC in Stage A, supra, and the resulting S- and N-protected cysteinyl-tyrosyl-isoleucyl-seryl tetrapeptide azide is then recovered in a conventional manner.

STAGE C (n) In the final Stage C of the process according to the invention, the S-protected pentapeptide V obtained from Stage A and the S- and N-protected tetrapeptide-azide XIV obtained from Stage B are reacted with each other at a temperature not higher than 0° C. and preferably below said temperature, in order to avoid side reactions at the serine radical, in an inert liquid dispersing medium, which is preferably a solvent, dioxan, dimethylformamide, acetonitrile and ethyl acetate being preferred.

(o) The resulting compound of the formula (XV)

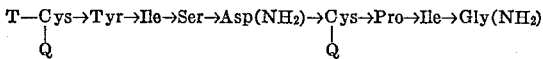

is then converted by reductive removal of the protective groups (Q and T) by treatment with an alkali metal, preferably sodium, dissolved in liquid ammonia, until no more alkali metal is consumed, which stage becomes noticeable by a permanent blue coloring of the ammonia, to the unprotected intermediate of the formula (XVI)

The latter compound is recovered from the reaction medium in a conventional manner and is then oxidized with molecular oxygen (air), or with potassium ferricyanide or ethylene diiodide at room temperature and at a pH of about 6 to 8.5 to ser$^4$-ile$^8$-oxytocin, i.e. the compound of Formula I, which is isolated in a conventional manner, preferably by lyophilization and subsequent purification by countercurrent distribution.

The following non-limitative examples serve to illustrate the production of the ser$^4$-ile$^8$-oxytocin via the key intermediate XVI for the production of the latter, according to the invention. All temperatures are given in degrees centigrade and the melting points are corrected. The specific rotations were determined in a tube of 10 cm. in length with a Lippich polarimeter manufactured by Schmidt & Haensch, Berlin, Germany.

The thin layer chromatograms used for testing the purity of the reaction products were produced as described by E. Stahl, Chemiker-Zeitung 82, 323 (1958) and also M. Brenner and A. Niederwieser, Experientia 16, 378 (1960), using silica gel G "Merck." The solvent systems were prepared by mixing the components in the volume ratios indicated in the examples. The reaction products were detected by the following methods:

(1) Ninhydrin method: conventional.
(2) Chlorine method: according to H. N. Rydon and P. W. G. Smith, Nature (London) 169, 922 (1952), modified according to F. Reindel and W. Hoppe, Chem. Ber. 87, 1103 (1954).
(3) Folin method: according to O. Folin and V. Ciocalteu, J. Biol. Chem. 73, 629 (1927).

In the examples, weights are given in grams (g.), volumes in milliliters (ml.), molar amounts in moles (M) and millimoles (mM.).

EXAMPLE 1

(a) Methyl N-carbobenzyloxy-L-isoleucyl-L-serinate 32.4 g. (0.122 M) of N-carbobenzyloxy-L-isoleucine (for example produced in accordance with P. A. Jaquenoud and R. A. Boissonnas, Helv. Chim. Acta 44, 133 [1961]) are dissolved in 320 ml. of absolute tetrahydrofuran, treated with 17.2 ml. (0.124 M) of triethylamine and cooled to −10°. 12.1 ml. (0.126 M) of chloroformic acid ethyl ester are added to this solution dropwise at −10°. After 15 minutes a solution of 18.67 g. (0.12 M) of L-serine methyl ester hydrochloride (for example produced according to St. Guttmann and R. A. Boissonnas, Helv. Chim. Acta 41, 1852 [1958]), which is cooled to −5°, and 16.9 ml. (0.122 M) of triethylamine in absolute chloroform are added over a period of 5 minutes. After stirring for 4 hours at 0°, the reaction mixture is evaporated in vacuo to dryness and the residue dissolved in a mixture of 1200 ml. of ethyl acetate and 200 ml. of water. The ethyl acetate layer is carefully washed with water, 1 N hydrochloric acid, water, 5% sodium hydrogen carbonate, and finally again with water, and then dried over sodium sulphate. After concentrating the solution and adding petroleum ether, the crude dipeptide ester crystallises; melting point: 179–180°.

For the purpose of purification, the product is crystallised twice from ethyl acetate/petroleum ether; melting point: 180.5–181.5° [α]$_D^{24°}$, +3.9° (c.=5 in dimethylformamide). The product behaves as a single component when analysed by thin-layer chromatography in the system benzene/acetone 7:3; detection: chlorine method.

(b) L-isoleucyl-L-serine methyl ester hydrochloride 26.0 g. (71 mM.) of N-carbobenzyloxy-isoleucyl-L-serine methyl ester are dissolved in 380 ml. of methanol and 6.25 ml. of concentrated hydrochloric acid and hydrogenated in a current of hydrogen in the presence of 5 g. of Pd-carbon (10% Pd) until development of carbon dioxide ceases. After removal of the catalyst, the solution is evaporated in vacuo to dryness. The residue is crystallised twice from methanol/ether and once from methanol/acetone/ether.

Decomposition point: 203–204° [α]$_D^{24°}$, +12.6° (c.=3.01 in methanol). The product gives a single spot on thin-layer chromatography in the systems: n-butanol/glacial acetic acid/water 3:1:1.
Methyl ethyl ketone/pyridine/water 65:5:20.
Detection: chlorine method, ninhydrin method.

(c) S-benzyl-N-tosyl-L-cysteinyl-L-tyrosyl-L-isoleucyl-L-serine methyl ester 3.55 g. (13.2 mM.) of L-isoleucyl-L-serine methyl ester hydrochloride are dissolved at room temperature in 30 ml. of dimethylformamide, cooled to 0°, treated with 1.85 ml. (13.2 mM.) of triethylamine and left to stand for 10 minutes being frequently shaken. The precipitated triethylamine hydrochloride is then filtered off and washed with 5 ml. of dimethylformamide. The solution of the free dipeptide ester is treated with a solution of 6.98 g. (13.2 mM.) of S-benzyl-N-tosyl-L-cysteinyl-L-tyrosine (produced according to the procedure of V. Du Vigneaud, M. F. Bartlett and A. Jöhl, J. Am. Chem. Soc. 79, 5572 [1957]) in 35 ml. of acetonitrile. The clear reaction solution is cooled to −10°. After adding 2.72 g. (13.2 mM.) of N,N'-dicyclohexyl-carbodiimide, N,N'-dicyclohexyl-urea and the tetrapeptide ester begin to precipitate after a short period. After stirring for 55 hours at −10°, the precipitated products are filtered off and washed with a small amount of cold dimethylformamide/acetonitrile (1:1) and with acetonitrile. In order to remove the N,N'-dicyclohexyl-urea, the crude product is taken up in 80 ml. of dimethylformamide and kept at 0° for 2 hours. The urea is filtered off and the reaction product is precipitated from the filtrate by adding 700 ml. of warm ethyl acetate. After three crystallisations from methanol the N,S-protected tetrapeptide ester produces a single spot on thin-layer chromatography in the systems benzene/acetone 1:1, chloroform/methanol/ammonia 17% 2:2:1, n-butanol/glacial acetic acid/water 3:1:1.

Detection: chlorine and Folin methods.

Melting point: 219–211°; sinters at 210°, $[\alpha]_D^{25°}$, −59.5° (c.=0.99 in formic acid), $[\alpha]_D^{23°}$, −16.2° (c.=0.98 in pyridine).

(d) *S-benzyl-N-tosyl-L-cysteinyl-L-tyrosyl-L-isoleucyl-L-serine-hydrazide*

5.57 g. (7.5 mM.) of S-benzyl-N-tosyl-L-cysteinyl-L-tyrosyl-L-isoleucyl-L-serine methyl ester are dissolved in 154 ml. of dimethylformamide. The solution is cooled to 0°, treated with 4.5 ml. of hydrazine hydrate (92.2 mM.) and left to stand at 0° for 45 hours. The reaction solution is then treated with 400 ml. of ice water with thorough ice cooling. In this way, the reaction product separates as a jelly-like precipitate. After being left to stand in the refrigerator for 2 hours, the crude hydrazide is filtered off, thoroughly washed with water and dried in vacuo over phosphorus pentoxide. The crude product is purified by crystallisation from dimethylformamide/acetonitrile. The crystalline product sinters at 222° and melts with decomposition at 226–229°, $[\alpha]_D^{24°}$, −69.2° (c.=1.79 in formic acid), $[\alpha]_D^{23°}$, +7.2° (c.=1.99 in dimethylformamide).

The product is uniform on thin-layer chromatography in the systems: n-butanol/glacial acetic acid/water 3:1:1, methyl ethyl ketone/pyridine/water 65:5:20.

Detection: chlorine and Folin methods.

(e) *N-terminal tetrapeptide azide*

*S-benzyl-N-tosyl-L-cysteinyl - L - tyrosyl-L-isoleucyl-L-serine azide.*—0.966 g. (1.3 mM.) of S-benzyl-N-tosyl-L-cysteinyl-L-tyrosyl-L-isoleucyl-L-serine hydrazide are dissolved in 35 ml. of dimethylformamide and 3.9 ml. of 1 N hydrochloric acid, cooled to −10° and treated carefully with 0.29 ml. of 5 N sodium nitrite. The solution is stirred for 10 minutes and the azide is precipitated with 45 ml. of ice water at a temperature of −8 to −5°. The jelly-like product is filtered off, thoroughly washed with cold water, 3% sodium hydrogen carbonate and again with cold water and dried at 0° for 4 hours in high vacuum.

Melting point: 244–246° (decomposition). Infra-red spectrum: distinct band at $\lambda=4.75\mu$ (—CO.N$_3$).

(f) *N-carbobenzyloxy-L-asparaginyl-S-benzyl-L-cysteine hydrazide*

14.2 g. (30 mM.) of N-carbobenzyloxy-L-asparaginyl-S-benzyl-L-cysteine methyl ester (for example produced according to M. Bodanszky and V. Du Vigneaud, J. Am. Chem. Soc. 81, 5688 [1959]) are dissolved in 250 ml. of dimethylformamide, cooled to 0° and treated with 7.3 ml. of hydrazine hydrate (150 mM.). The reaction solution is kept at 0° for 55 hours. Upon addition of 1800 ml. of ethanol, the crude hydrazide precipitates having a melting point of 213–215° (decomposition). After being crystallised twice from dimethylformamide/acetonitrile, the melting point of the product increased to 214.5–215.5° (decomposition), $[\alpha]_D^{25°}$, −33.9° (c.=2.01 in formic acid), $[\alpha]_D^{25°}$, −29.7° (c.=0.52 in dimethylformamide).

The product is homogenous on thin-layer chromatography in the system n-butanol/glacial acetic acid/water 3:1:1.

Detection: chlorine method.

(g) *N-carbobenzyloxy-L-asparaginyl-S-benzyl-L-cysteine azide*

3.6 ml. (18 mM.) of precooled 5 N sodium nitrite are added dropwise at a temperature of −10° to a stirred solution of 7.103 g. (15 mM.) of N-carbobenzyloxy-L-asparaginyl-S-benzyl-L-cysteine hydrazide in 135 ml. of dimethylformamide and 45 ml. of 1 N hydrochloric acid. After approximately 2 minutes, the azide precipitates in crystalline form. After stirring for 15 minutes at −10°, the solution is carefully treated with 80 ml. of water to obtain a complete separation of the azide. The precipitate is filtered off, washed with cold water, cold 2% sodium hydrogen carbonate and with water again and dried for 26 hours at 0° in high vacuum. Melting point: 124° (decomposition). Infra-red spectrum: distinct bands at $\lambda=4.75\mu$ (—CO.N$_3$); still free from isocyanate ($\lambda=4.5\mu$) even after being left to stand for 10 days at room temperature.

(h) *L-isoleucyl-glycine ethyl ester hydrochloride*

15.3 g. (44 mM.) of N-carbobenzyloxy-L-isoleucyl-glycine ethyl ester (produced according to P. A. Jaquenoud and R. A. Boissonnas, Helv. 44, 113 [1961]), dissolved in 200 ml. of glacial acetic acid, are treated at room temperature for 7½ hours with hydrogen in the presence of 1.1 equivalents of concentrated hydrochloric acid and 5 g. of Pd-carbon (10% Pd). After removal of the solvent in vacuo, the oily residue crystallises after being triturated with dry ether several times. The reaction product melts at 136–137° after recrystallisation from ethanol-ether 1:5, $[\alpha]_D^{24°}$, +13.9° (c.=3.0 in absolute ethanol).

On thin-layer chromatography it is uniform in the system: n-butanol/glacial acetic acid/water 3:1:1.

Detection: ninhydrin method.

(i) *N-carbobenzyloxy-L-prolyl-L-isoleucyl-glycine ethyl ester*

12.15 g. (48 mM.) of L-isoleucyl-glycine ethyl ester hydrochloride are dissolved in 120 ml. of absolute chloroform, cooled to 0° and treated at 0° with 7.4 ml. (52.8 mM.) of triethylamine and a solution of 22.2 g. (60 mM.) of p-nitrophenyl-N-carbobenzyloxy-L-prolinate (produced according to M. Bodanszky and V. Du Vigneaud, J. Am. Chem. Soc. 81, 5688 [1959]) in 40 ml. of absolute chloroform. The yellow reaction solution is stirred for 20 hours at room temperature. The solution is diluted with 400 ml. of chloroform, extracted 3 times with 90 ml. of 1 N hydrochloric acid each time, 4 times with 90 ml. of 1 N ammonia each time and 3 times with 90 ml. of water each time and dried over sodium sulphate. The solvent is removed in vacuo and the crystalline residue is recrystallised twice from ethyl acetate. Melting point: 159–160°, $[\alpha]_D^{24°}$, −86.4° (c.=1.99 in methanol).

The product gives a single spot on thin-layer chromatography in the systems: benzene/acetone 7:3 and n-butanol/glacial acetic acid/water 3:1:1.

Detection: chlorine method.

(j) *N-carbobenzyloxy-L-prolyl-L-isoleucyl-glycinamide*

15.5 g. (35.7 mM.) of N-carbobenzyloxy-L-prolyl-L-isoleucyl-glycine ethyl ester are dissolved in 400 ml. of methanol, and the resulting solution saturated with dry ammonia gas at 0°. After standing for 30 hours at room temperature, the reaction solution is evaporated in vacuo at 30° to dryness and the residue crystallised from methanol/water 1:3. The product melts at 183–184.5°, $[\alpha]_D^{24°}$, −65.7° (c.=1.90 in methanol).

It is uniform on thin-layer chromatography in the systems: benzene/acetone 3:7 and n-butanol/glacial acetic acid/water 3:1:1.

Detection: chlorine method.

(k) *L-prolyl-L-isoleucyl-glycinamide*

9.35 g. (22.3 mM.) of N-carbobenzyloxy-L-prolyl-L-isoleucyl-glycinamide are dissolved in 200 ml. of methanol, mixed with 1.1 equivalents of aqueous hydrochloric acid and treated with hydrogen for 5 hours in the presence of Pd-carbon (10% Pd). After removal of the catalyst the reaction solution is evaporated in vacuo at 35°. The colourless, foam-like residue is crystallised once from methanol/chloroform and twice from methanol/ethyl acetate. The hydrochloride of the tripeptidamide obtained in this manner melts, after sintering at 214°, at 215.5–218° with decomposition [α]$_D^{24°}$, −42.4° (c.=2.1 in ethanol 95%).

In order to obtain the free base, the above hydrochloride is dissolved in 50 ml. of methanol and the solution is filtered through an ion exchange column of 100 g. of Dowex–21K (OH-Form), previously treated with methanol. The column is then washed with a total of 400 ml. of methanol and the chloride-free eluate is evaporated in vacuo at 30°. The tripeptidamide remains as a cluster of needles with a melting point of 171.5–173°, [α]$_D^{24°}$, −65.5° (c.=2.02 in glacial acetic acid).

The tripeptidamide produced a single spot on thin-layer chromatography in the systems: n-butanol/glacial acetic acid/water 3:1:1, methyl ethyl ketone/pyridine/water 65:5:20.

Detection: ninhydrin method.

The above tripeptidamide has already been produced by P. A. Jaquenoud and R. A. Boissonnas, Helv. Chim. Acta 44, 113 [1961], in a similar manner which differs from the synthesis indicated in the preceding by removal of the carbobenzyloxy groups by means of hydrobromic acid in glacial acetic acid and the use of the mixed N-carbobenzyloxy-proline-ethoxy formic acid anhydride instead of the p-nitrophenyl N-carbobenzyloxy-L-prolinate, the tripeptidamide obtained having a melting point of 118° and the specific rotation of [α]$_D^{21°}$, −63° ±1° (c.=2 in glacial acetic acid).

(*l*) *N-carbobenzyloxy-L-asparaginyl-S-benzyl-L-cysteinyl-L-prolyl-L-isoleucyl-glycinamide*

The N-carbobenzyloxy - L-asparaginyl-S-benzyl-L-cysteine azide, produced as described under (*g*), is dissolved in 150 ml. of cold dimethylformamide and added to a solution of 4.264 g. (15 mM.) of L-prolyl-L-isoleucyl-glycinamide (see (*k*)) and 2.1 ml. (15 mM.) of triethylamine in 50 ml. of dimethylformamide. The reaction solution is stirred for 56 hours at a temperature of 0° to +3°. After this period, the azide-band at 4.75µ can no longer be observed in the Infra-red spectrum.

For the purpose of isolating the reaction product, the solution is cooled to −10° and the reaction product is precipitated as a jelly-like mass by carefully adding 750 ml. of ice cold water. The precipitate is filtered off, thoroughly washed with cold water and dried in vacuo over phosphorus pentoxide. In order to remove impurities, the finely powdered crude product is intimately triturated three times with 40 ml. of acetonitrile/methanol 4:1 each time and filtered off. After two crystallisations from dimethylformamide/acetonitrile 1:4, the N,S-protected pentapeptidamide possesses a melting point of 233–235° (decomposition), [α]$_D^{23°}$, −51.3° (c.=1.03 in dimethylformamide), [α]$_D^{25°}$, −79.3° (c.=1.03 in glacial acetic acid).

The protected pentapeptide behaves as a single component on thin-layer chromatography in the systems: n-butanol/glacial acetic acid/water 3:1:1, methyl ethyl ketone/pyridine/water 65:5:20, methanol/chloroform 2:1.

Detection: chlorine method.

The same N,S-protected pentapeptidamide is obtained by coupling N-carbobenzyloxy-L-asparaginyl-S-benzyl-L-cysteine, prepared according to R. A. Boissonnas, St. Guttmann, P. A. Jaquenoud and J. P. Waller, Helv. 38, 1491 [1955], with L-prolyl-L-isoleucyl-glycinamide in dimethylformamide/acetonitrile 1:4.4 by the use of N,N'-dicyclohexyl-carbodiimide.

(*m*) *C-terminal pentapeptidamide*

*L-asparaginyl-S-benzyl - L - cysteinyl-L-prolyl-L-isoleucyl-glycinamide.*—2.01 g. (2.78 mM.) of N-carbobenzyloxy-L-asparaginyl-S-benzyl - L-cysteinyl-L-isoleucyl-glycinamide are treated with 12 ml. of 2 N hydrobromic acid in glacial acetic acid. The carbobenzyloxy compound is completely dissolved after 40 minutes. After stirring for 2½ hours at 20°, 35 ml. of absolute ether are added to the deep yellow solution, whereupon the hydrobromide of the S-protected pentapeptidamide precipitates as a resinous mass. The precipitate becomes granular after repeated trituration with absolute ether. It is filtered off and reprecipitated twice from ethanol/ether.

The same hydrobromide is obtained using hydrobromic acid in trifluoroacetic acid, whereas the use of trifluoroacetic acid at reflux temperature yields the corresponding trifluoroacetate.

In order to obtain the free S-protected pentapeptidamide, 2.46 g. (3.66 mM.) of L-asparaginyl-S-benzyl-L-cysteinyl-L-prolyl-L-isoleucyl-glycinamide hydrobromide are dissolved in 30 ml. of methanol and filtered through an ion exchange column of 60 g. of Dowex–21K (OH-Form), previously treated with methanol. The free pentapeptidamide is eluated with 250 ml. of methanol and the bromide-free eluate is evaporated at 30° in vacuo with exclusion of moisture to dryness. The residue is reprecipitated once from absolute ethanol/absolute ether and once from acetone/ethyl acetate/ether. The S-protected pentapeptidamide is obtained as a colourless hygroscopic powder which is used directly for coupling with the N,S-protected tetrapeptide azide obtained as described under (*e*).

(*n*) *S-benzyl-N-tosyl-L-cysteinyl - L-tyrosyl-L-isoleucyl-L-seryl-L-asparaginyl-S-benzyl - L - cysteinyl-L-prolyl-L-isoleucyl-glycinamide*

To a solution of the N,S-protected tetrapeptide azide, produced under (*e*), 35 ml. of dimethylformamide, which is cooled to −10°, a solution of 0.769 g. (1.3 mM.) of L-asparaginyl-S-benzyl-L-cysteinyl - L - prolyl-L-isoleucyl-glycinamide (produced under (*m*)) and 0.18 ml. (1.3 mM.) of triethylamine in 5 ml. of dimethylformamide, cooled to −10°, is added. The temperature is raised to −7 to −5° and the reaction solution is stirred for 22 hours at this temperature. After this time, the characteristic azide band at 4.75µ disappeared in the Infra-red spectrum.

The N,S,S'-protected nonapeptidamide is precipitated by careful addition of 130 ml. of ice water. The precipitate is isolated by filtration and washed successively with cold water, 0.5 N hydrochloric acid, water, 3% sodium hydrogen carbonate, and water and then dried over phosphorus pentoxide in vacuo. The product sinters at 205° and melts at 211–217°. For the purpose of purification, it is reprecipitated four times from dimethylformamide/acetonitrile 1:6 and washed with dimethylformamide/acetonitrile 1:7, methanol/acetonitrile 1:5, acetonitrile, ethyl acetate and ether respectively; melting point, after sintering at 211°, is 222.5–228.5° (decomposition), [α]$_D^{24°}$, −22.7° (c.=1.44 in dimethylformamide).

(*o*) *S,S' - dehydro-L-cysteinyl - L - tyrosyl-L-isoleucyl-L-seryl-L-asparaginyl-L-cysteinyl - L - prolyl-L-isoleucyl-glycinamide=ser$^4$-ile-$^8$-oxytocin*

100 mg. (0.767 mM.) of N-tosyl-S-benzyl-L-cysteinyl-L - tyrosyl-isoleucyl-L-seryl-L-asparaginyl - S - benzyl-L-cysteinyl-L-prolyl-L-isoleucyl-glycinamide are dissolved in 150 ml. of liquid ammonia (redistilled over sodium) and sodium is added in small pieces to the solution until the blue colour remains for about 5 minutes. The excess sodium is destroyed with ammonium chloride, the ammonia evaporated, and the residue liberated in the vacuum exsiccator over concentrated sulphuric acid from the traces of remaining ammonia. The residue, consisting mainly of L-cysteinyl - L - tyrosyl - L - isoleucyl-L-seryl-L-asparaginyl-L-cysteinyl - L - prolyl - L - isoleucyl-glycinamide and salts, is then dissolved in 200 ml. of ice water, the solution adjusted to pH 6.6 to 6.8 with 2 N acetic acid, and an air current is passed through until the mixture gives a negative test with sodium nitroprussiate. The reaction solution is then adjusted to pH 4 with 2 N acetic acid, filtered through a Hyflo filter and lyophilized.

The crude product is purified by counter-current distribution according to Craig (L. C. Craig, Analytic Chemistry, 22, 1346 [1950]) in the system: secondary butanol/0.017 N acetic acid. The main fraction with a distribution coefficient K of 0.53 at 25° has an oxytocic activity of about 130 IU/mg. on an isolated rat uterus.

EXAMPLE 2

(a) 1-(N-carbobenzyloxy-L-seryl)-2-(tert.-butoxycarbonyl)-hydrazine 3.59 g. (15 mM.) of N-carbobenzyloxy-L-serine (for example, produced according to St. Guttmann and R. A. Boissonnas, Helv. 41, 1852 [1958] or E. Baer and J. Maurukas, J. Biol. Chem. 212, 25 [1955]) and 2.18 g. (16.5 mM.) of tert.-butoxycarbonyl hydrazine (for example, produced according to L. A. Carpino, J. Am. Chem. Soc. 79, 98 and 4427 [1957] and L. A. Carpino, C. A. Ciza and B. A. Carpino, ibid. 81, 955 [1959]) are dissolved in 35 ml. of methanol. A solution of 6.99 g. (16.5 mM.) of 1-cyclohexyl-3-(2-morpholinyl-(4)-ethyl)-carbodiimide metho-p-toluene-sulphonate in 15 ml. of methanol is added within 1 hour at 0°. After standing for 20 hours at 0°, the methanol is distilled off in vacuo and the remaining oil is dissolved in ethyl acetate and water. The ethyl acetate solution is carefully washed with water, 2 N citric acid, water, 5% sodium hydrogen carbonate, and finally with water, and dried over sodium sulphate. After removal of the ethyl acetate in vacuo, the product remains as an oil which crystallises upon addition of ether. The crude product is recrystallised from ethyl acetate/hexane. Melting point: 99–101° or 112–113°. Polymorph: identity of IR-spectra in solution, identical optical activity; the same behaviour on thin-layer chromatography $[\alpha]_D^{25°}$, −25.9° (c.=2.11 in methanol) (Yield: 2.95 g. [56%]).

The product is uniform on thin-layer chromatography in the systems: benzene/acetone 6:4, methyl ethyl ketone/pyridine/water 65:5:20, n-butanol/glacial acetic acid/water 3:1:1.

Detection: chlorine method.

Instead of methanol, also acetonitrile can be used as solvent and 1-cyclohexyl-3-(2 morpholinyl - (4)-ethyl)-carbodiimide metho-p-toluene-sulphonate can be replaced by N,N′-dicyclohexyl-carbodiimide.

(b) 1-(L-seryl)-2-(tert.-butoxycarbonyl)-hydrazine benzene sulphonate 14.8 g. (41.9 mM.) of 1-(N-carbobenzyloxy-L-seryl)-2-(tert.-butoxycarbonyl)-hydrazine are dissolved in 250 ml. of methanol and the solution is hydrogenated in a stream of hydrogen in the presence of Pd-carbon (10% Pd). The catalyst is filtered off and the filtrate concentrated in vacuo. The remaining oil is extracted twice with absolute ether and then dried in vacuo. The product, which is in the form of a solid foam, is used directly for the following step (c).

In order to characterize the amorphous 1-(L-seryl)-2-tert.-butoxycarbonyl)-hydrazine, the crude product is converted into the crystalline benzene sulphonate as follows: 2.8 g. of benzene sulphonic acid are dissolved in 6 ml. of ice-cold methanol and added to an ice-cold solution of 3 g. (13.7 mM.) of 1-(L-seryl)-2-(tert.-butoxycarbonyl)-hydrazine in 6 ml. of methanol. After the addition of 150 ml. of anhydrous ether, the benzene sulphonate separates as an oil which crystallises upon scratching. The product is filtered off, washed with methanol/ether and purified by recrystallisation from ethanol/ether. Melting point: 151.5–153.5° (with decomposition), $[\alpha]_D^{25°}$ +14.4° (c.=1.96 in methanol). The product is homogenous on thin-layer chromatography in the systems: benzene/ethanol 7:3, methanol/chloroform/ 17% NH$_3$ 2:2:1, and n-butanol/pyridine/glacial acetic acid/water 90:60:18:72.

Detection: ninhydrin method.

(c) 1-(N-carbobenzyloxy-L-isoleucyl-L-seryl)-2-(tert.-butoxycarbonyl)-hydrazine A solution of 2.7 g. (12.35 mM.) of 1-(L-seryl)-2-(tert.-butoxycarbonyl)-hydrazine and 4.77 g. (12.35 mM.) of p-nitrophenyl N-carbobenzyloxy-L-isoleucinate, produced, for example, according to M. Bodanszky and V. Du Vigneaud, J. Am. Chem. Soc. 81, 5688 [1959], in 24 ml. of ethyl acetate is stirred for 48 hours at 13–14°. After about 7 hours the protected dipeptide begins to precipitate. Finally the reaction mixture is cooled to 0°, the product is filtered off and carefully washed with cold ethyl acetate. After two crystallisations from hot ethyl acetate it melts at 187–188° with decomposition. $[\alpha]_D^{25°}$, −36° (c.=2.01 in methanol). It is uniform on thin-layer chromatography in the system: benzene/ethanol 7:3.

Detection: chlorine method.

(d) 1-(L-isoleucyl-L-seryl)-2-(tert.-butoxycarbonyl)-hydrazine 13.4 g. (28.8 mM.) of 1-(N-carbobenzyloxy - L-isoleucyl-L-seryl)-2-(tert.-butoxycarbonyl)-hydrazine in 300 ml. of methanol are hydrogenated in the presence of Pd-carbon (10% Pd). After removal of the catalyst the methanol is evaporated in vacuo. The oily residue is repeatedly treated with ether and ether/petroleum ether and each time the solvent is distilled off. The resulting granular residue is then treated with ethyl acetate and filtered off. The product is purified by recrystallisation from acetonitrile. Melting point: 133–134° (with decomposition above 134°), $[\alpha]_D^{26°}$, −36.1°, (c.=1.99 in methanol).

The product produced a single spot on thin-layer chromatography in the system: benzene/ethanol 8:2.

Detection: ninhydrin method.

(e) 1-(S-benzyl-N-tosyl-L-cysteinyl-L-tyrosyl-L-isoleucyl-L-seryl)-2-(tert.-butoxycarbonyl)-hydrazine To a solution of 2.22 g. (4.2 mM.) of S-benzyl-N-tosyl-L - cysteinyl - L - tyrosin (produced according to V. Du Vigneaud, M. F. Bartlett and A. Jöhl, J. Am. Chem. Soc. 79, 5572 [1957]) and 1.41 g. (4.2 mM.) of 1-(L-isoleucyl-L-seryl)-2-(tert.-butoxycarbonyl)-hydrazine in 2 ml. of dimethylformamide/acetonitrile 1:1, cooled to −10°, 0.89 g. (4.3 mM.) of N,N′-dicyclohexylcarbodiimide are added. The reaction mixture is stirred for 52 hours at −10°. During the reaction, N,N′-dicyclohexyl urea and the protected tetrapeptide hydrazide precipitate. 70 ml. of ice-cold water are then added, the precipitate is filtered off and carefully washed with water, 3% sodium hydrogen carbonate and finally again with water. In order to remove the N,N′-dicyclohexyl urea, the crude product is taken up in 8.3 ml. of dimethylformamide. After standing for 2 hours at 0°, the urea is filtered off and washed with 1.5 ml. of dimethylformamide, 50 ml. of acetonitrile are added to the filtrate, whereupon the protected tetrapeptide hydrazide precipitates as a jelly-like mass. It is filtered off, washed with cold acetonitrile and ether and recrystallised twice from dimethylformamide/acetonitrile. Melting point: 227–229° (with decomposition). $[\alpha]_D^{26°}$, −30.2° (c.=1.96 in pyridine). The product produced a single spot on thin-layer chromatography in the systems: methyl ethyl ketone/pyridine/water 65:5:20, benzene/ethanol 8:2, n-butanol/pyridine/glacial acetic acid/water 90:60:18:72.

Detection: chlorine and Folin method.

(f) S-benzyl-N-tosyl-L-cysteinyl-L-tyrosyl-L-isoleucyl-L-serine hydrazide 0.506 g. (0.6 mM.) of 1-(S-benzyl-N-tosyl-L-cysteinyl-L-tyrosyl-L-isoleucyl-L-seryl)-2-(tert. - butoxycarbonyl)-hydrazine are dissolved in 10 ml. of cold 90% trifluoroacetic acid and the solution is left to stand for one and a quarter hours. It is then cooled to 0° and the product is precipitated with 65 ml. of ice water. The product is filtered off and washed with water, 3% sodium hydrogen carbonate, water, and finally with acetonitrile. After recrystallisation from dimethylformamide/acetonitrile or dimethylformamide/methanol, the protected tetrapeptide hydrazide shows the same properties (melting point, thin-layer chromatographic behaviour and optical activity) as the hydrazide obtained by hydrazinolysis of S-benzyl-N-tosyl-L-cysteinyl-L-tyrosyl-L - isoleucyl - L - serine methyl ester (see Example 1(d)). Melting point: 126–129° (with decomposition), $[\alpha]_D^{26°}$, $+6.3°$ (c.=2.11 in dimethylformamide), $[\alpha]_D^{26°}$, $-69.3$ (c.=2.06 in formic acid).

What we claim is:

1. L-cysteinyl-L-tyrosyl-L-isoluecyl-L-seryl-L - asparaginyl-L-cysteinyl-L-prolyl-L-isoleucyl-glycinamide.

2. S,S'-protected, N-protected L-cysteinyl-L-tyrosyl-L-isoleucyl-L-seryl-L-asparaginyl-L-cysteinyl-L - prolyl - L-isoleucyl-glycinamide, wherein each of the S-protecting groups is a member selected from the group consisting of benzyl, diphenylmethyl, trityl and benzylthiomethyl, and wherein the N-protecting group is a member selected from the class consisting of tosyl, benzyloxycarbonyl, t-butoxycarbonyl and trityl.

3. L-asparaginyl-S-protected-L-cysteinyl-L - prolyl - L-isoleucyl-glycinamide wherein the S-protecting group is benzyl.

4. N-protected, S-protected L-asparaginyl-L-cysteinyl-L-prolyl-L-isoleucyl-glycinamide wherein the N-protecting group is a member selected from the group consisting of t-butoxycarbonyl, benzyloxycarbonyl, and trityl, and wherein the S-protecting group is a member selected from the group consisting of benzyl, diphenylmethyl, trityl benzylthiomethyl.

5. N-protected L-asparaginyl-S-protected L-cysteinyl hydrazide, wherein the N-protecting group is a member selected from the group consisting of t-butoxycarbonyl, benzyloxycarbonyl, and trityl and wherein the S-protecting group is a member selected from the group consisting of benzyl, diphenylmethyl, trityl and benzylthiomethyl.

6. N-protected, S-protected L-cysteinyl-L-tyrosyl-L-isoleucyl-L-serine hydrazide, wherein the S-protecting group is a member selected from the group consisting of benzyl, diphenylmethyl, trityl and benzylthiomethyl, and wherein the N-protecting group is a member selected from the class consisting of tosyl, benzyloxycarbonyl, t-butoxycarbonyl and trityl.

7. A lower alkyl ester of S-protected,N-protected L-cysteinyl-L-tyrosyl-L-isoleucyl-serine, wherein the S-protecting group is a member selected from the group consisting of benzyl, diphenylmethyl, trityl and benzylthiomethyl, and wherein the N-protecting group is a member selected from the class consisting of tosyl, benzyloxycarbonyl, t-butoxycarbonyl and trityl.

8. A lower alkyl ester of L-isoleucyl-L-serine.

9. A lower alkyl ester of N-protected L-isoleucyl-L-serine, wherein the N-protecting group is a member selected from the group consisting of t-butoxycarbonyl, benzyloxycarbonyl, and trityl.

10. S-benzyl-N-tosyl-L-cysteinyl-L-tyrosyl-L - isoleucyl-L-seryl-L-asparaginyl-S-benzyl-L-cysteinyl - L - prolyl - L-isoleucyl-glycinamide.

11. L-asparaginyl-S-benzyl-L-cysteinyl-L-prolyl-L - isoleucyl-glycinamide.

12. N-carbobenzyloxy-L - asparaginyl - S - benzyl - L-cysteinyl-L-prolyl-L-isoleucyl-glycinamide.

13. N-carbobenzyloxy-L-asparaginyl - S - benzyl - L-cysteine hydrazide.

14. S-benzyl-N-tosyl-L-cysteinyl-L-tyrosyl-L - isoleucyl-serine methyl ester.

15. 1-(N-carbobenzyloxy-L-seryl) - 2 - (t - butoxycarbonyl)-hydrazine.

16. L-isoleucyl-L-serine methyl ester.

17. N-carbobenzyloxy-L-isoleucyl - L - serine methyl ester.

18. 1-(L-seryl)-2-(t-butoxycarbonyl)-hydrazine.

19. 1-(N-carbobenzyloxy-L-isoleucyl-L-seryl) - 2 - (t-butoxycarbonyl)-hydrazine.

20. 1-(L-isoleucyl-L-seryl) - 2 - (t - butoxycarbonyl)-hydrazine.

21. 1-(S-benzyl-N-tosyl-L-cysteinyl-L-tyrosyl - L - isoleucyl-L-seryl)-2-(t-butoxycarbonyl)-hydrazine.

References Cited by the Examiner

UNITED STATES PATENTS 2,854,443    9/1958    Boissonnas et al. ____ 260—112.5

LEWIS GOTTS, *Primary Examiner.*

P. A. STITH, *Assistant Examiner.*